M. ZAVOR.
PLOW.
APPLICATION FILED NOV. 13, 1919.
1,368,005.
Patented Feb. 8, 1921.
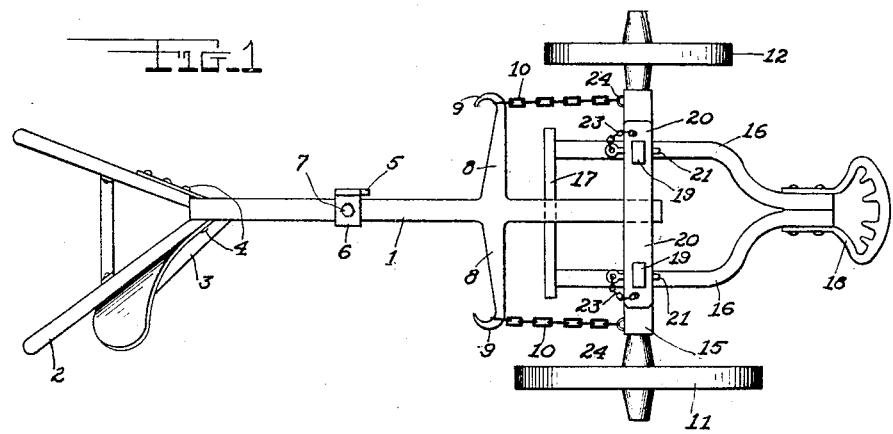
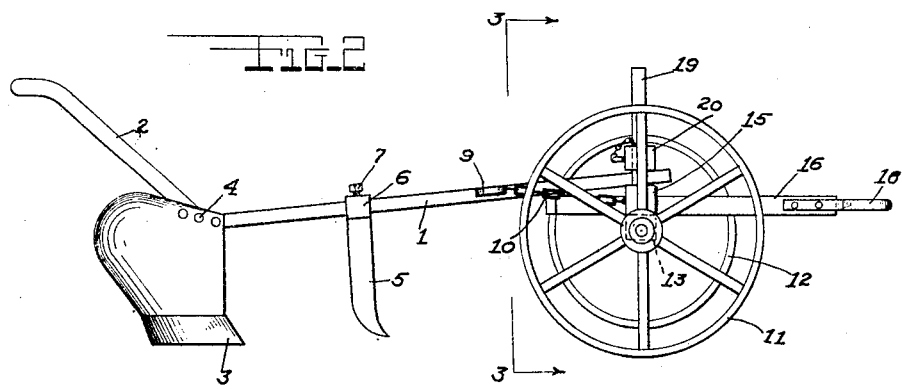
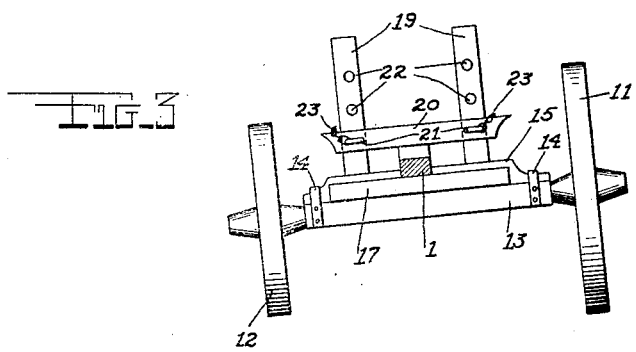
INVENTOR.
*Mike Zavor*
BY *George C. Heinritz*
ATTORNEY.

UNITED STATES PATENT OFFICE.

MIKE ZAVOR, OF ACME, WYOMING.

PLOW.

1,368,005. Specification of Letters Patent. Patented Feb. 8, 1921.

Application filed November 13, 1919. Serial No. 337,762.

*To all whom it may concern:*

Be it known that I, MIKE ZAVOR, a citizen of Poland, residing at Acme, county of Sheridan, and State of Wyoming, have invented certain new and useful Improvements in Plows, of which the following is a specification.

This invention relates to plows, having more particular reference to plows used in preparing land for cultivation.

The invention has for an object to provide a plow capable of easy guidance and operation and characterized in addition by flexibility of control.

For further comprehension of the invention, and of the objects and advantages thereof, reference will be had to the following description and accompanying drawings, and to the appended claim in which the various features of the invention are more particularly set forth.

Figure 1 of the drawings is a plan view of a plow constructed according to my invention.

Fig. 2 is a side elevation thereof.

Fig. 3 is a transverse section on the line 3—3 of Fig. 2.

My invention as here shown comprises a novel combination of a plow proper and draft and running gear therefor. The plow proper comprises a rigid tongue 1 to the rear end of which are secured the diverging handles 2, a plow share 3 being secured by rivets 4 at the junction of handles 2 and tongue 1.

Mounted upon, and depending from, the tongue 1 is a knife 5 which may be adjusted longitudinally along the tongue as desired, the knife being here shown as carried by a rectangular collar 6 loosely surrounding the tongue and secured thereto by a bolt 7.

Formed on the tongue 1 toward the forward end thereof are the oppositely extending lateral arms 8 having hooked outer ends 9 to which are secured the rear ends of a pair of chains 10. The forward ends of these chains are secured to the draft gear of the plow as will be presently pointed out.

This draft gear comprises truck elements consisting of a pair of wheels 11 and 12 mounted on opposite ends of an axle 13. As clearly shown in the drawings the wheel 11, which is on the same side of the plow as the main blade of the plowshare 3, is of larger diameter than the wheel 12 on the opposite side of the plow.

Fixed upon the axle 13 by means of straps 14 is a beam 15 and between this beam and the axle are clamped a pair of draft bars 16 whose rear ends are connected by a cross brace 17 and whose forward ends converge inwardly toward one another and have fixed thereon a yoke 18 whereby connection may be made to one or more draft animals by means of the usual harness.

Extending upwardly from the beam 15 are a pair of posts 19 upon which a crosshead bar 20 is slidably mounted, the posts passing through suitable apertures in the bar. This bar may be secured at varying distances above the beam 15 by means of pins 21 passing through suitable apertures in the crosshead bar and through the proper ones of the vertically spaced apertures 22 in the posts, the pins being permanently attached to the crosshead bar, to prevent loss thereof, by the chains 23.

The beam 15 has fixed thereto a pair of eyes 24 and to these eyes the forward ends of the draft chains 10 are secured, while the forward end of the tongue 1 projects freely into the space inclosed by the beam 15, crosshead bar 20 and posts 19, the plow being thus prevented from any excessive deflecttion during operation while at the same time the necessary variation is permitted.

In addition to the advantages just referred to the plow may be readily manipulated for cutting the proper depth and for properly turning over of the soil.

Having thus described my invention what I claim as new and desire to protect by Letters Patent of the United States is as follows:

In a device of the character described, the combination of an implement beam having lateral hooked arms, a wheeled axle, chains connecting said axle and the arms of said implement beam, a beam secured to said axle by straps, a pair of draft bars clamped between said beam and axle, cross-bars connecting the rear ends of said draft bars, the forward ends of said draft bars converging inwardly, a yoke on said converging ends, a pair of posts extending upwardly from said beam, a cross-head bar slidably mounted on said posts, and means for securing said cross-head bar at varying distances above said beam, the forward end of said implement bar extending into a space formed by said cross-head bar, posts and said beam substantially as described, and for the purpose set forth.

In testimony whereof I have affixed my signature.

MIKE ZAVOR.